United States Patent
Fischer et al.

(10) Patent No.: US 7,181,324 B2
(45) Date of Patent: Feb. 20, 2007

(54) OCCUPANT RECOGNITION SYSTEM FOR VEHICLES

(75) Inventors: Thomas Fischer, Wenden (DE); Lars Wiemer, Duesseldorf (DE)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/829,533

(22) Filed: Apr. 22, 2004

(65) Prior Publication Data

US 2004/0243295 A1    Dec. 2, 2004

(30) Foreign Application Priority Data

Apr. 23, 2003    (EP) ................. 03009242

(51) Int. Cl.
*B60R 21/01*    (2006.01)
*B60R 21/015*   (2006.01)

(52) U.S. Cl. .......................... 701/36; 180/273
(58) Field of Classification Search ............ None
See application file for complete search history.

(56) References Cited

U.S. PATENT DOCUMENTS

| | | | |
|---|---|---|---|
| 5,918,696 A | 7/1999 | VanVoorhies | 180/273 |
| 5,957,491 A | 9/1999 | Cech et al. | 280/735 |
| 5,987,370 A * | 11/1999 | Murphy et al. | 701/45 |
| 6,041,658 A | 3/2000 | Casey | 73/714 |
| 6,056,079 A | 5/2000 | Cech et al. | 180/273 |
| 6,089,106 A | 7/2000 | Patel et al. | 73/862.582 |
| 6,138,067 A * | 10/2000 | Cobb et al. | 701/45 |
| 6,490,936 B1 * | 12/2002 | Fortune et al. | 73/862.581 |
| 6,542,802 B2 | 4/2003 | Gray et al. | |
| 6,578,871 B2 | 6/2003 | Gray et al. | 280/735 |
| 6,587,770 B1 | 7/2003 | Gray et al. | 701/45 |
| 6,605,877 B1 | 8/2003 | Patterson et al. | 307/10.1 |
| 6,650,978 B1 | 11/2003 | Patterson et al. | 701/35 |
| 6,677,538 B2 * | 1/2004 | Cook et al. | 177/25.13 |
| 6,683,534 B2 | 1/2004 | Patterson et al. | 340/436 |
| 6,818,842 B2 | 11/2004 | Gray et al. | 177/144 |
| 7,000,948 B2 | 2/2006 | Little et al. | 280/743.1 |
| 2004/0118619 A1 | 6/2004 | Gray et al. | 177/144 |

FOREIGN PATENT DOCUMENTS

| | | |
|---|---|---|
| EP | 0891898 | 1/1999 |
| EP | 0900705 | 1/1999 |
| WO | 01/62539 | 8/2001 |

* cited by examiner

*Primary Examiner*—Michael J. Zanelli
(74) *Attorney, Agent, or Firm*—Jimmy L. Funke

(57) ABSTRACT

An occupant recognition system for vehicles comprises at least one pressure sensor arranged beneath the foam of a vehicle seat, at least one temperature sensor and an electronic control and/or evaluation unit to which the sensors are connected. Means are provided to match the time behavior, in particular the time behavior present on changes in the ambient temperature, of the output signal of the temperature sensor arranged at a distance from the pressure sensor or from the seat foam to the time behavior of the temperature prevailing in the region of the pressure sensor or of the seat foam.

17 Claims, 4 Drawing Sheets

OCCUPANT RECOGNITION SYSTEM FOR VEHICLES

TECHNICAL FIELD

The invention relates to an occupant recognition system for vehicles comprising at least one pressure sensor arranged beneath the foam of a vehicle seat, at least one temperature sensor and an electronic control and/or evaluation unit to which the sensors are connected.

BACKGROUND OF THE INVENTION

As a rule, a flexible sensor mat filled with fluid is used with such a passive occupant recognition system to detect the pressure which a weight loading the respective vehicle seat brings about. The sensor mat is arranged beneath the seat foam and consequently at least substantially exposed to the same temperature as the seat foam. Since the pressure measured is dependent on the temperature to a high degree, as a rule a temperature sensor is used to measure the temperature of the system. The temperature sensor is preferably arranged within the electronic control and/or evaluation unit. The physically relevant temperature is, however, the foam temperature.

The temperature value measured by the temperature sensor has previously been used for the calculation of the temperature compensation value. On the heating up and cooling down of the vehicle or with all transitional temperature effects, the temperature of the electronic control and/or evaluation unit, however, deviates greatly from the foam temperature. The time constant decisive for the time behavior of temperature is in the range of approximately 30 min. for foam and at approximately 5 min. for the electronic control and/or evaluation unit.

In particular with greater temperature changes, a difference therefore occurs between the temperature measured by the temperature sensor and the temperature actually prevailing in the seat foam. The seat foam heats up more slowly than the temperature sensor or the region in which the temperature sensor is arranged. If now, for example, a decision is made with reference to the pressure measured whether an airbag should be switched on or not, such parameter values as, for example, the empty pressure and the allow threshold have to be changed in accordance with the temperature measured on the temperature compensation. In the case of greater temperature changes, an incorrect compensation or an incorrect setting of the parameter values in question therefore takes place in the present case based on the temperature measured by the temperature sensor.

SUMMARY OF THE INVENTION

It is the underlying object of the invention to provide an improved occupant recognition system of the kind first named in which the previously named problems have been eliminated.

This object is satisfied in accordance with the invention in that means are provided to match the time behavior, in particular the time behavior present on changes in the ambient temperature, of the output signal of the temperature sensor arranged at a distance from the pressure sensor or from the seat foam to the time behavior of the temperature prevailing in the region of the pressure sensor or of the seat foam.

As a result of this design, a temperature signal is now available in the form of the matched output signal of the temperature sensor which is representative for the foam temperature. The correspondingly matched output signal of this temperature sensor can now be used in the electronic control and/or evaluation unit for the compensation of the temperature dependence of the pressure measured via the pressure sensor. Since the correspondingly matched output signal of the temperature sensor is used for the compensation, a reliable compensation is always ensured.

The matching means are preferably associated with the electronic control and/or evaluation unit.

In a preferred practical embodiment of the occupant recognition system in accordance with the invention, the matching means include a low-pass filter. In particular a software filter can be used as such a low-pass filter.

A Butterworth filter and in particular a Butterworth filter of the first order is preferably provided as the low-pass filter.

The parameters of the filter are expediently selected such that the filtered output signal of the temperature sensor agrees at least substantially with the foam temperature obtained from the trial measurements. On respective changes in the ambient temperature, the filtered output signal of the temperature sensor should therefore behave at least approximately in the same manner as the foam temperature.

As already mentioned, the pressure sensor can in particular include a flexible sensor mat filled with fluid. The pressure sensor can in particular provide a pressure value corresponding to the pressure inside the sensor mat. As the ambient temperature rises, the pressure measured in the flexible mat filled with fluid also rises despite the weight loading the motor vehicle seat remaining the same. This temperature dependence is then compensated using the output signal of the temperature sensor which has been matched to the foam temperature or correspondingly filtered in the manner described.

The pressure sensor is expediently arranged directly beneath the seat foam.

The temperature sensor can in particular include a thermistor.

The temperature sensor can in particular be arranged in the region of the electronic control and/or evaluation unit. It is preferably accommodated in the same housing as this electronic control and/or evaluation unit.

The electronic control and/or evaluation unit is preferably arranged and fastened beneath the vehicle seat.

In a preferred practical embodiment of the occupant recognition system in accordance with the invention, the pressure measured via the pressure sensor is compared by means of the electronic control and/or evaluation unit with at least one parameter value such as an empty pressure value and/or an allow threshold and a decision is made in dependence on the result of the comparison whether an airbag is switched on or not, with the relevant parameter value being changed accordingly as part of the compensation of the temperature dependence.

In accordance with the invention, a software filter is therefore preferably used to obtain an estimated value for the foam temperature in particular on the basis of the measured temperature of the electronic control and/or evaluation unit after a corresponding filtration.

BREIF DESCRIPTION OF THE DRAWINGS

The present invention will now be described, by way of example, with reference to the accompanying drawings, in which.

DESCRIPTION OF THE PREFERRED EMBODIMENT

Figure 1:
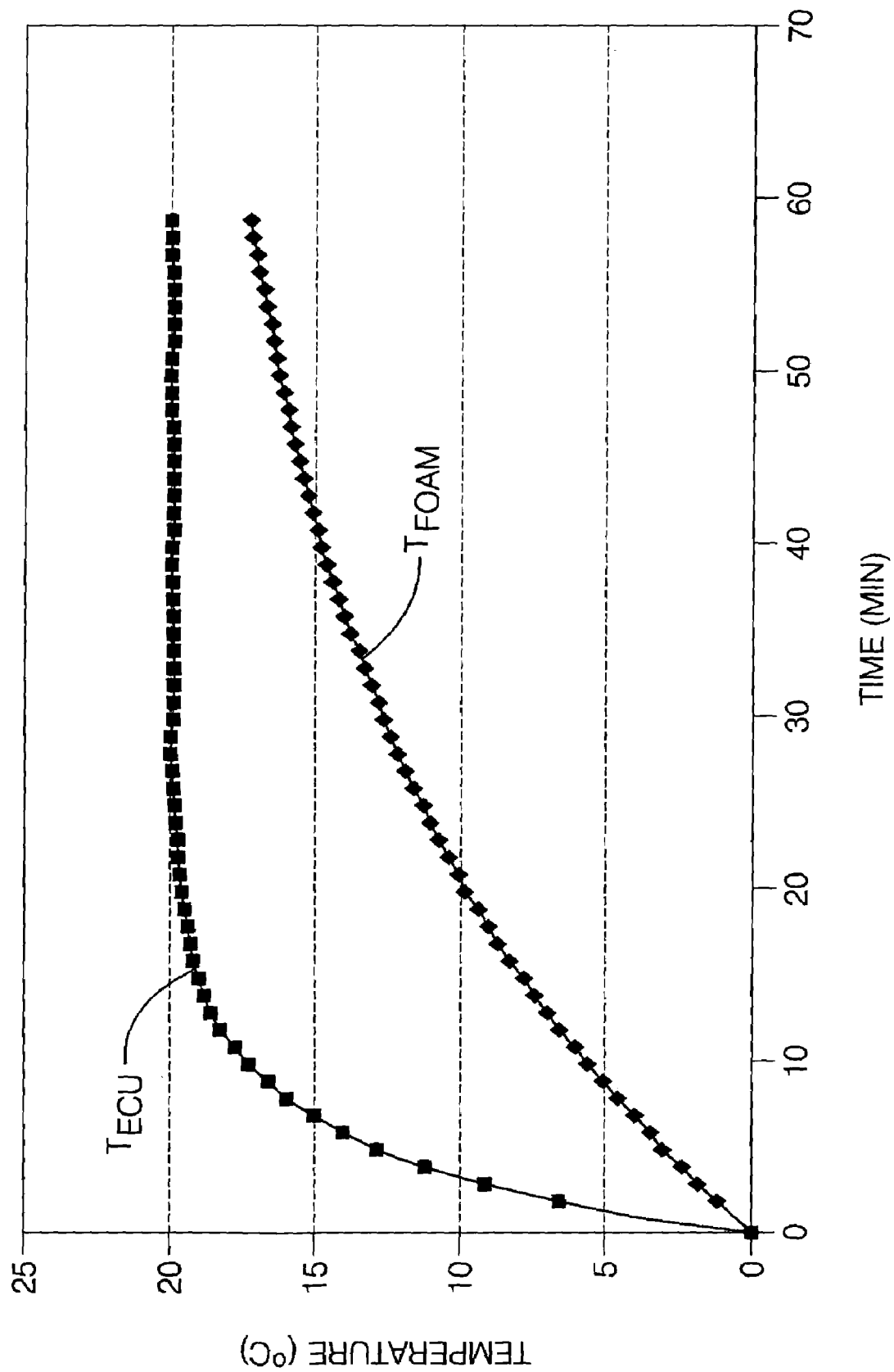
FIG. 1, is a time diagram from which the different influence of a changing ambient temperature on the foam temperature and on the temperature of the electronic control and/or evaluation unit results.

The different influence of a changing ambient temperature on the foam temperature and on the temperature of the electronic control and/or evaluation unit measured by the temperature sensor results from the time diagram in accordance with FIG. 1. The curve $T_{ECU}$ represents the development of the temperature prevailing in the control and/or evaluation unit and the curve $T_{Foam}$ represents the development of the foam temperature.

As already mentioned, the pressure sensor can in particular be a flexible sensor mat filled with fluid. The pressure in this sensor mat is temperature dependent. The pressure measured in the sensor mat thus also increases as the ambient temperature increases despite the weight on the vehicle seat remaining the same. A decision is made by means of the control and/or evaluation unit with reference to the measured pressure whether, for example, an airbag is switched on or not. Consequently, a temperature compensation is required, i.e. the parameter values such as the empty pressure and the allow threshold are changed in accordance with the temperature measured.

The temperature sensor or thermistor provided for this purpose in the occupant recognition system is disposed in the electronic control and/or evaluation unit of the system which can in particular be arranged and fastened beneath the vehicle seat. At extreme temperature changes, the temperature $T_{ECU}$ measured by the temperature sensor and the actually prevailing temperature in the seat foam $T_{Foam}$ differ form one another. The seat foam thus heats up more slowly than the temperature sensor or thermistor. However, it is the temperature $T_{Foam}$ of the seat foam which is relevant for the measured pressure so that in the case of extreme temperature changes in the vehicle, for example the empty pressure and the allow threshold would be incorrectly compensated on the basis of the temperature measured by the temperature sensor.

Two different heating procedures must now be considered, namely that of the temperature sensor or thermistor and that of the seat foam. It must be considered here that the seat foam heats up more slowly due to its heat insulating properties than the pressure sensor or the region in which it is arranged.

Figure 2:
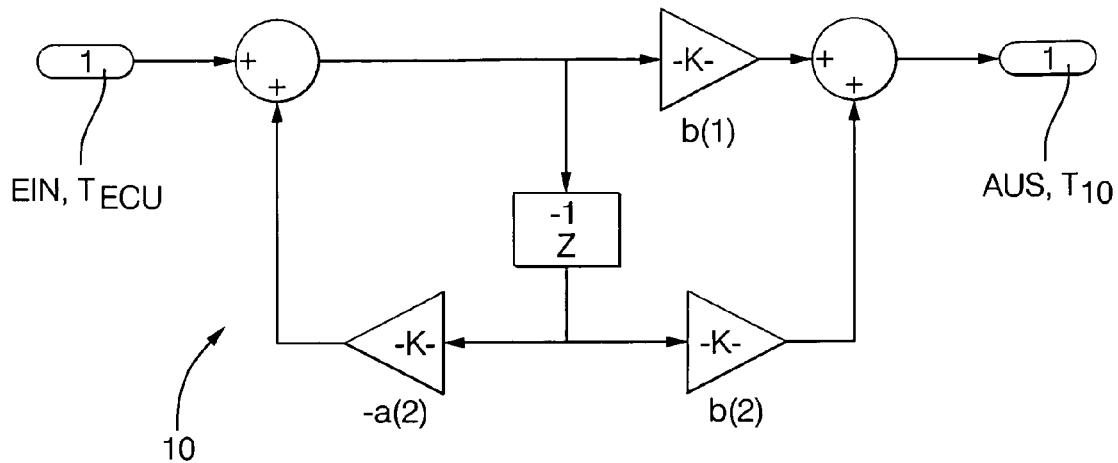
FIG. 2, is a circuit diagram of a Butterworth low-pass filter of the first order for the filtering of the output signal of the temperature sensor.

In a preferred embodiment of the occupant recognition system in accordance with the invention, an approximation to the foam temperature $T_{Foam}$ now takes place in that the output signal of the temperature sensor or thermistor is filtered by means of a Butterworth low-pass filter of the first order. In FIG. 2, such a filter is shown which is provided with the reference numeral "10" here.

On the filtering of the output signal of the temperature sensor by means of such a Butterworth low-pass filter of the first order, a temperature curve is obtained which agrees very well with the temperature prevailing in the foam. A temperature compensation based on such a filtered temperature signal is correspondingly more precise.

A corresponding low-pass filter at a very low cut-off frequency has the effect that fast changes in the thermistor signal, for example due to a fast heating up of the inner space of the motor vehicle—are delayed and a temperature development is accordingly simulated which corresponds to the heating up procedure of the seat foam. At a constant temperature or at a small temperature gradient, the filter 10 has no effect.

Before the preferred numerical realization of the filter is looked at, the likewise feasible analytical approach should also be mentioned beforehand:

The solution of the differential equation for the heat transfer provides $$T_{ECU} = T_\infty + (T_{ECU,t=0} - T_\infty) \cdot e^{-\frac{t}{\tau_{ECU}}} \qquad 1)$$

$$T_{Foam} = T_\infty + (T_{Foam,t=0} - T_\infty) \cdot e^{-\frac{t}{\tau_{Foam}}}, \qquad 2)$$

where the two time constants $\tau_{ECU}$ and $\tau_{Foam}$ for the electronic control and/or evaluation unit (ECU) and the foam (Foam) differ from one another. These time constants can, for example have the following values:

$\tau_{ECU} \approx 10$ min.

$\tau_{Foam} \approx 30$ min.

The ideal solution would be as follows:

The determination of the ambient temperature $T_\infty$ from the temperature $T_{ECU}$ of the electronic control and/or evaluation unit and its temporal derivation $\dot{T}_{ECU}$ becomes $$T_\infty = T_{ECU} + \tau_{ECU} \cdot \dot{T}_{ECU}, \qquad 3)$$

from which the following results:

$$T_{Foam} = (T_{ECU} + \tau_{ECU} \cdot \dot{T}_{ECU}) + \Delta T_{t=0} \cdot e^{\frac{t}{\tau_{ECU}}}, \qquad 4)$$

where $\Delta T_{t=0} = T_{ECU,\,t=0} - T_\infty$.

However, this only applies to a stationary process ($T_\infty$=const.).

In the preferred numerical realization of the filter, the current measured value (n) of the temperature sensor and its preceding value (n−1) are required for the calculation of the foam temperature.

The input value "Ein" of the Butterworth low-pass filter of the first order shown in FIG. 2 is the temperature $T_{ECU}$ measured by the temperature sensor. The output value "Aus" corresponds to the foam temperature $T_{Foam}$.

The following relationship applies to the foam temperature $T_{Foam}$:

$$T_{Foam} = C \cdot z(n) + D \cdot T_{ECU}(n). \qquad 5)$$

The intermediate value $z(n)$ is calculated from its predecessor $z(n-1)$ and from the preceding measured value $T_{ECU}(n-1)$ of the temperature sensor or thermistor:

$$z(n) = A \cdot z(n-1) + B \cdot T_{ECU}(n-1), \qquad 6)$$

where the start value results from the following relationship:

$$z(0) = T_{ECU}(0) \cdot (1-D)/C \qquad 7)$$

The parameters A, B, C and D of the Butterworth low-pass filter 10 are preferably selected such that the filtered temperature signal agrees with the foam temperature gained from trial measurements. They are determined by the cut-off frequency of the filter 10 and can be calculated with corresponding software.

Figure 3:
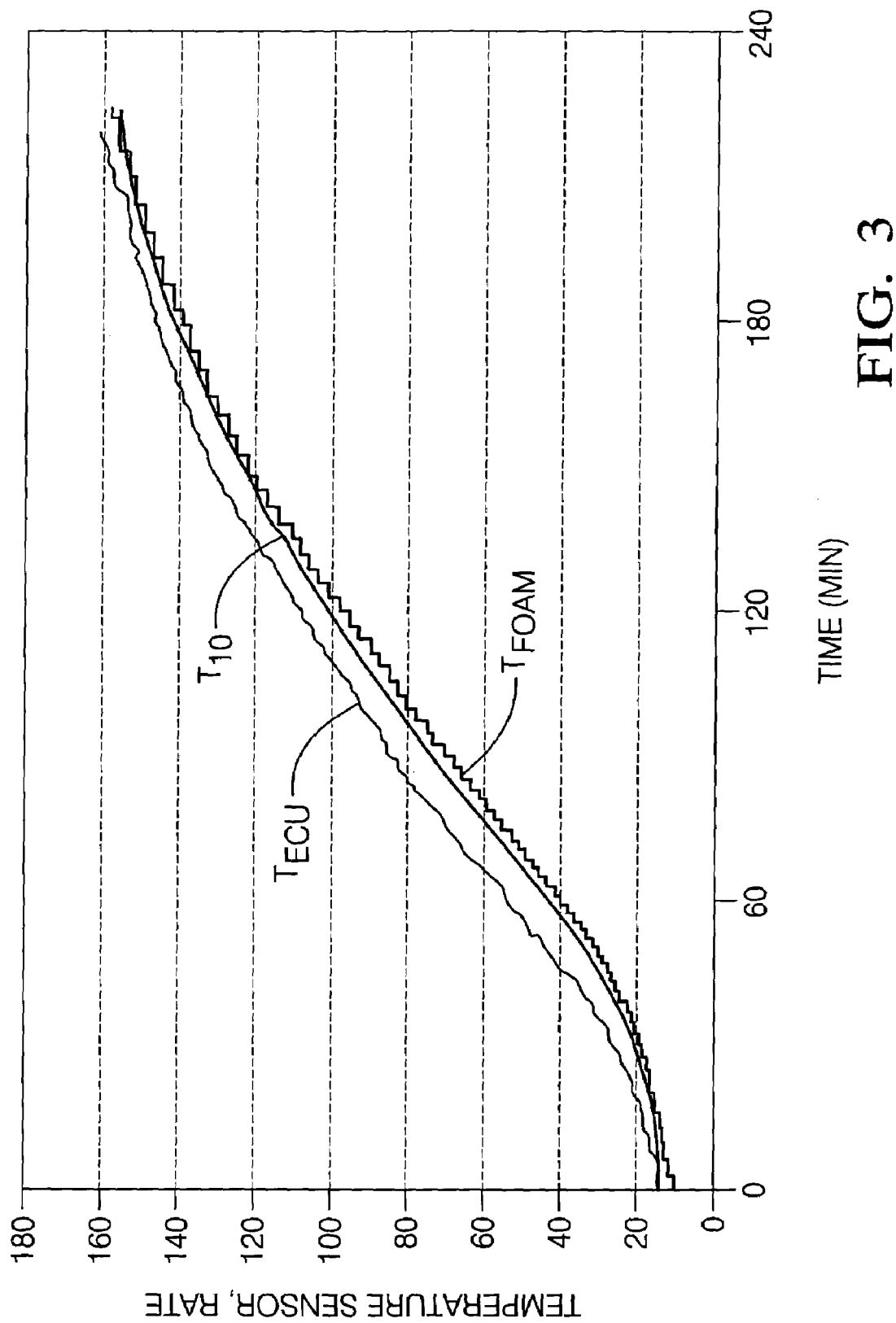
FIG. 3, is a time diagram from which the respective time curve of the temperature measured via the temperature sensor, of the measured foam temperature and the output signal of the temperature sensor filtered by means of the Butterworth low-pass filter results.

The time diagram in accordance with FIG. 3 gives the respective time development of the temperature $T_{ECU}$ measured via the temperature sensor, of the measured foam temperature $T_{Foam}$ and of the output signal $T_{10}$ of the temperature sensor filtered by means of the Butterworth low-pass-filter 10. Accordingly, the filtered output signal $T_{10}$ largely agrees with the actual foam temperature $T_{Foam}$ such that a precise temperature compensation is possible based on it.

Figure 4:
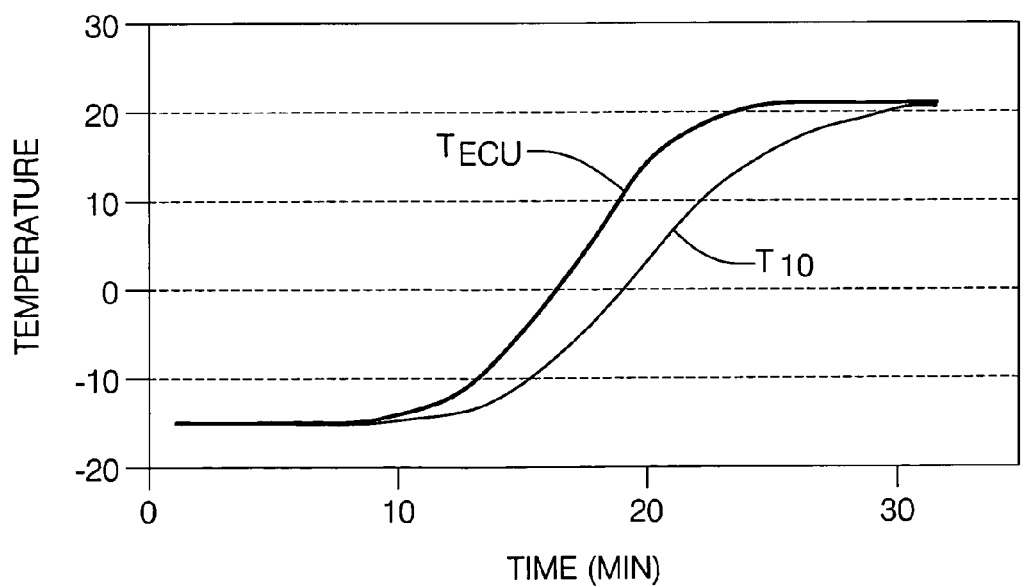
FIG. 4, is a further time diagram in which the output signal of the filter and the output signal of the temperature sensor are again compared with one another.

FIG. 4 shows a further time diagram in which the output signal $T_{10}$ of the filter 10 and the output signal $T_{ECU}$ of the temperature sensor are again compared with one another at a different scale.

Figure 5:
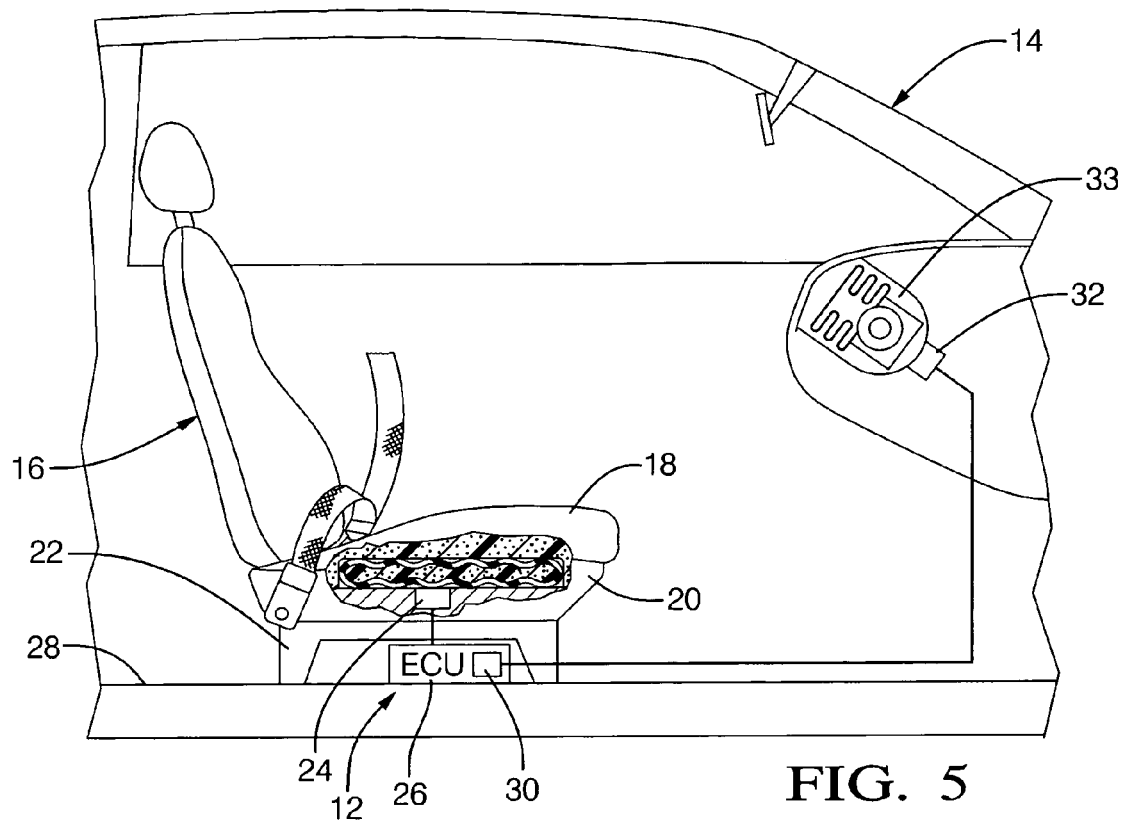
FIG. 5, is a broken view of an occupant recognition system in application within a passenger vehicle.

FIG. 5 illustrates an occupant recognition system 12 installed within a passenger vehicle 14. A vehicle seat assembly 16, including a foam seat cushion 18 carried by a seat frame 20, is mounted to the vehicle floor 28 by intermediate posts 22. Posts 22 carry the vehicle seat 16 in a spaced relationship above the vehicle floor 28. A pressure sensor 24 is arranged directly beneath the seat foam 18 and includes an output 25 for connection to an electronic control unit and/or evaluation unit 26, which is affixed to the vehicle floor 28 directly beneath the seat 16. A temperature sensor 30, preferably comprising a thermistor, having an output 31 connected to the electronic control unit and/or evaluation unit 26 is located to sense ambient temperature within or near the electronic control unit and/or evaluation unit 26. Thus arranged, the temperature sensor is located at a distance from the pressure sensor 24 and foam cushion 18. The electronic control unit and/or evaluation unit 26 is connected to control a switch 32 operating an airbag 33 within vehicle 14.

Figure 6:
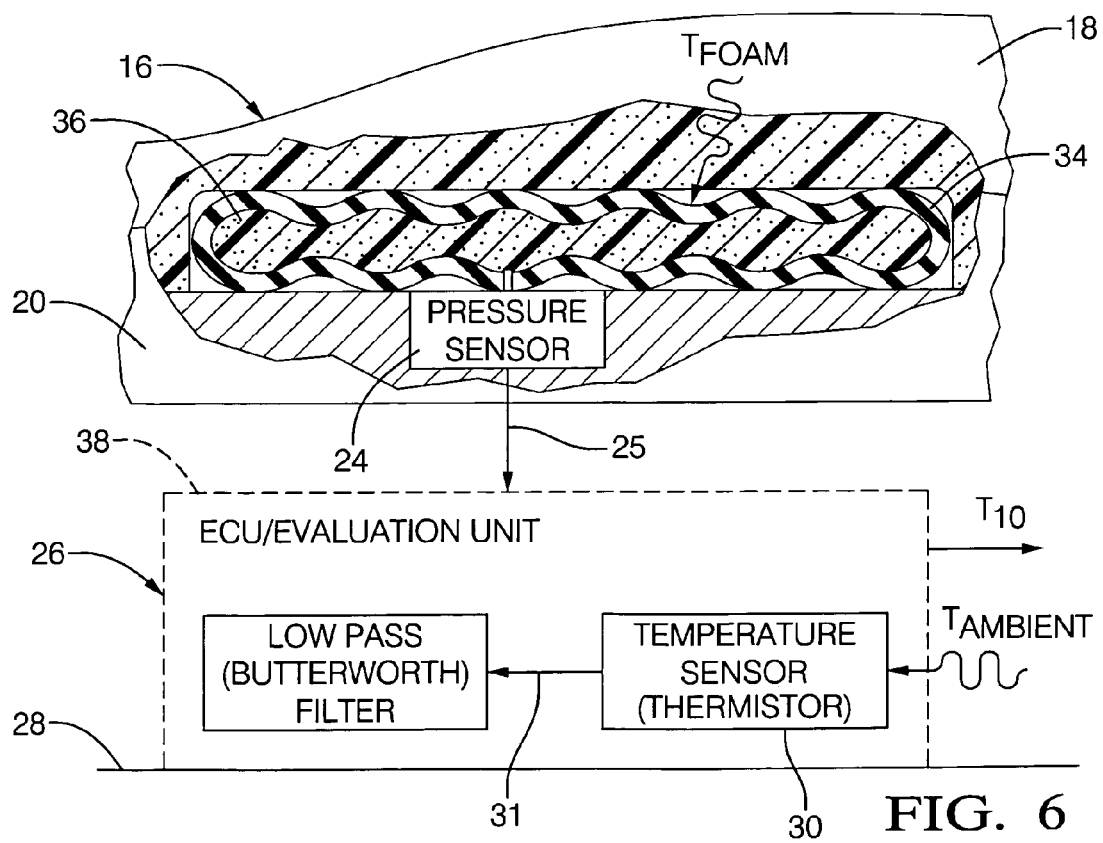
FIG. 6, is a schematic diagram of the occupant recognition system of FIG. 5.

FIG. 6 illustrates the occupant recognition system 12 on an enlarged scale. The pressure sensor 24 includes a flexible sensor mat 34 filled with fluid 36. The electronic control unit and/or evaluation unit 26 and the temperature sensor 30 are disposed within a common housing 38.

The invention claimed is:

1. An occupant recognition system for vehicles comprising:
   at least one pressure sensor disposed adjacent a foam vehicle seat;
   at least one temperature sensor spaced from said seat and operative to monitor ambient air temperature within said vehicle; and
   an electronic control and evaluation unit connected to said sensors and operative to match the time behavior of sensed changes in the ambient air temperature to the time behavior of the temperature prevailing in the region of the pressure sensor.

2. An occupant recognition system in accordance with claim 1, wherein a correspondingly matched output signal of the at least one temperature sensor is used for the compensation of the temperature dependence of the pressure measured via the pressure sensor.

3. An occupant recognition system in accordance with claim 1, wherein matching means are embodied within the electronic control and evaluation unit.

4. An occupant recognition system in accordance with claim 3, wherein the matching means includes a low-pass filter.

5. An occupant recognition system in accordance with claim 4, wherein the low-pass filter comprises a software filter.

6. An occupant recognition system in accordance with claim 4, wherein a Butterworth filter is provided as the low-pass filter.

7. An occupant recognition system in accordance with claim 4, wherein a Butterworth filter of the first order is provided as the low-pass filter.

8. An occupant recognition system in accordance with claim 4, wherein parameters of the filter are selected such that a filtered output signal of the temperature sensor substantially coincides with actual foam temperature.

9. An occupant recognition system in accordance with claim 1, wherein the pressure sensor includes a flexible sensor mat filled with fluid.

10. An occupant recognition system in accordance with claim 9, wherein the pressure sensor supplies a pressure value corresponding to the pressure inside the sensor mat.

11. An occupant recognition system in accordance with claim 1, wherein the pressure sensor is disposed directly beneath the seat foam.

12. An occupant recognition system in accordance with claim 1, wherein the temperature sensor includes a thermistor.

13. An occupant recognition system in accordance with claim 1, wherein the temperature sensor is disposed adjacent the electronic control and evaluation unit.

14. An occupant recognition system in accordance with claim 13, wherein the temperature sensor is disposed in a common housing with the electronic control and evaluation unit.

15. An occupant recognition system in accordance with claim 1, wherein the electronic control and evaluation unit is disposed beneath the vehicle seat.

16. An occupant recognition system in accordance with claim 1, wherein the pressure measured via the pressure sensor is compared by means of the electronic control and evaluation unit with at least one parameter value and a vehicle airbag switch status is changed in response thereto.

17. A vehicle occupant recognition system comprising:
   at least one pressure sensor adapted to be disposed adjacent a vehicle foam seat cushion;
   at least one temperature sensor adapted to be spaced from said foam seat cushion and operative to monitor ambient temperature within said vehicle and to generate an output signal in response thereto; and
   a control unit in circuit with said sensors operative to match the time behavior of said temperature sensor output signal to the time behavior of the temperature prevailing in a region of the seat foam adjacent said pressure sensor.

* * * * *